United States Patent
Lee et al.

(10) Patent No.: US 11,467,034 B2
(45) Date of Patent: Oct. 11, 2022

(54) TEMPERATURE MEASURING DEVICE FOR TRACKED SUBJECT TARGET REGION

(71) Applicant: ILOODA Co., Ltd., Suwon-si (KR)

(72) Inventors: Sang Joon Lee, Asan-si (KR); Dong Wook Kim, Suwon-si (KR); Jae Ho Lee, Suwon-si (KR); Jae Moon Jung, Seongnam-si (KR); Min Ju Kim, Hwaseong-si (KR); Tae Hoon Kim, Gunpo-si (KR)

(73) Assignee: ILOODA Co., Ltd., Suwon-si (KR)

(*) Notice: Subject to any disclaimer, the term of this patent is extended or adjusted under 35 U.S.C. 154(b) by 0 days.

(21) Appl. No.: 17/084,653

(22) Filed: Oct. 30, 2020

(65) Prior Publication Data
US 2021/0404877 A1    Dec. 30, 2021

(30) Foreign Application Priority Data

Jun. 30, 2020  (KR) .................. 10-2020-0080027
Jun. 30, 2020  (KR) .................. 10-2020-0080115
Jun. 30, 2020  (KR) .................. 10-2020-0080146

(51) Int. Cl.
G01J 5/00          (2022.01)
G06V 10/25         (2022.01)
(Continued)

(52) U.S. Cl.
CPC .............. G01J 5/0025 (2013.01); G01J 5/10 (2013.01); G06T 7/74 (2017.01); G06V 10/25 (2022.01);
(Continued)

(58) Field of Classification Search
CPC ........... G01J 5/0025; G01J 2005/0077; G06K 9/00362; G06K 9/3233; G06V 10/25;
(Continued)

(56) References Cited

U.S. PATENT DOCUMENTS 11,195,341 B1 * 12/2021 Canberk ............... G06T 19/006
2007/0023662 A1 *  2/2007 Brady .................. G01J 5/0022
                                                    250/338.3
(Continued)

FOREIGN PATENT DOCUMENTS

AU    2009227780 A1 *  5/2010  ........... G01J 5/0025
CN      111339992 A  *  6/2020
(Continued)

OTHER PUBLICATIONS

H. Ohata and T. Fujii, "Development of an automatic tracking and measuring system for human surface temperature," 2013 International Symposium on Intelligent Signal Processing and Communication Systems, 2013, pp. 688-693, doi: 10.1109/ISPACS.2013.6704637. (Year: 2013).*

(Continued)

*Primary Examiner* — Michael Robert Cammarata
(74) *Attorney, Agent, or Firm* — Revolution IP, PLLC

(57) ABSTRACT

The present invention relates to a temperature measuring device of a non-contact manner, in a simple configuration at a lower cost than a thermal imaging camera, recognizing a movable target object to be measured using a general camera, and measuring the temperature of the movable target object, wherein the temperature measuring device is provided for recognizing the position information of the movable target object and correcting an error according to a difference in distance or angle from the movable target object to enable accurate temperature measurement.

9 Claims, 8 Drawing Sheets

(51) Int. Cl.
  *G06V 40/10* (2022.01)
  *G01J 5/10* (2006.01)
  *G06T 7/73* (2017.01)

(52) U.S. Cl.
  CPC ...... *G06V 40/10* (2022.01); *G01J 2005/0077* (2013.01); *G06T 2207/20081* (2013.01); *G06T 2207/30196* (2013.01)

(58) Field of Classification Search
  CPC .......... G06V 40/10; G06T 2207/30196; G06T 2207/30201; A61B 5/01
  See application file for complete search history.

(56) References Cited

U.S. PATENT DOCUMENTS

| | | | | |
|---|---|---|---|---|
| 2007/0153871 | A1* | 7/2007 | Fraden | G01J 5/0022 374/121 |
| 2008/0154138 | A1* | 6/2008 | McQuilkin | G01J 5/522 600/473 |
| 2010/0329301 | A1* | 12/2010 | Pang | A61B 5/015 374/121 |
| 2016/0379060 | A1* | 12/2016 | Li | H04N 5/23296 382/103 |
| 2017/0258335 | A1* | 9/2017 | Heller | A61B 5/015 |
| 2017/0344833 | A1* | 11/2017 | Ahlberg | G06K 9/00771 |
| 2021/0295028 | A1* | 9/2021 | Xie | G01V 9/005 |
| 2021/0378520 | A1* | 12/2021 | Rao | A61B 5/01 |
| 2021/0385276 | A1* | 12/2021 | Binder | H04L 67/12 |
| 2022/0090811 | A1* | 3/2022 | Li | G06V 10/25 |

FOREIGN PATENT DOCUMENTS

| | | | | |
|---|---|---|---|---|
| CN | 112070185 | A | * 12/2020 | |
| CN | 112129411 | A | * 12/2020 | |
| CN | WO-2021196411 | A1 | * 7/2021 | |
| JP | 2001-099714 | A | 4/2001 | |
| JP | 2005-237861 | A | 9/2005 | |
| JP | 2005237861 | A | * 9/2005 | |
| JP | 2009-183560 | A | 8/2009 | |
| JP | 2011-179897 | A | 9/2011 | |
| JP | 2012-008058 | A | 1/2012 | |
| KR | 10-1997-022256 | A | 12/1998 | |
| KR | 10-2011-0035335 | A | 4/2011 | |
| KR | 10-2015-0124072 | A | 11/2015 | |
| KR | 10-2016-0066445 | A | 6/2016 | |
| KR | 10-2017-0109389 | A | 9/2017 | |
| KR | 20180023555 | A | * 3/2018 | ......... A61B 5/02433 |
| KR | 10-2019-0124029 | A | 11/2019 | |
| KR | 10-2019-0125682 | A | 11/2019 | |
| KR | 20190124029 | | * 11/2019 | |
| KR | 102235462 | B1 | * 4/2021 | |
| WO | WO-2021207283 | A1 | * 6/2021 | |
| WO | WO-2021204947 | A | * 10/2021 | |
| WO | WO-2021242621 | A1 | * 12/2021 | ............... A61B 5/01 |

OTHER PUBLICATIONS

T. Wirthgen, S. Zipser, U. Franze, S. Geidel and G. Lempe, "Automatic infrared based temperature measuring system for health monitoring in veterinary applications," Sensors, 2011 IEEE, 2011, pp. 1800-1803, doi: 10.1109/ICSENS.2011.6127107. (Year: 2011).*

* cited by examiner (a)

(b)

(a)        (b)

the body temperature of people or livestock with the thermal imaging camera as in the prior art is not accurate and inefficient.

Meanwhile, since the conventional thermal imaging camera only displays the temperature by color and cannot measure the distance to the subject, the temperature measurement error according to the distance cannot be overcome.

Therefore, in the case of a subject far from the temperature measuring device, there is a problem in that the temperature of the subject may be incorrectly measured.

Meanwhile, the conventional thermal imaging camera has a problem in that it is not possible to grasp the type of the subject or the temperature of a specific position of the subject when the subjects are overlapped, and it is not possible to recognize and store the temperature of a specific subject separately and manage the temperature by time.

KR10-1997-022256, KR10-2019-0125682, KR10-2019-0124029, KR10-2011-0035335, etc. are disclosed as prior art related to a non-contact temperature measuring device.

TEMPERATURE MEASURING DEVICE FOR TRACKED SUBJECT TARGET REGION

BACKGROUND OF THE INVENTION

Field of the Invention

The present invention relates to a temperature measuring device and control method for the same. More specifically, the present invention relates to a temperature measuring device capable of measuring the temperature of a single object or a plurality of objects in a non-contact manner.

Description of the Related Art

Methods of measuring the temperature of a subject include a contact type using a thermocouple, a thermistor, and the like, and a non-contact type using a thermal imaging camera using an infrared image sensor.

Since measuring the temperature of a person or livestock is to know whether or not they are infected with a disease, the contact-type temperature measurement method, in which a person directly measures the temperature of a subject, poses a risk of virus infection from the subject. The non-contact method of temperature measurement tends to be preferred.

A representative of such a non-contact temperature measuring device is a thermal imaging camera.

A thermal imaging camera is a device that detects infrared radiation irradiated from a subject using an image sensor that responds to infrared rays and outputs it as a thermal image which is different from a general digital camera.

Since the thermal imaging camera displays the heat condition of the subject's surface as a thermal image, the distribution of the surface temperature of the subject can be known even if the subject and the thermal imaging camera are some distance apart.

Such a thermal imaging camera is a device that shows a temperature state of the surface of the subject photographed using an image sensor configured by arranging a plurality of infrared sensing elements. However the thermal imaging camera has a limitation in being used for general purposes because it is quite expensive.

However, measuring the temperature of a subject such as a person or livestock does not require measuring the temperature state of the entire body, but only a specific part of the body, for example, in the case of a human, the forehead of the face can be measured. It is inefficient to measure the temperature of people or livestock using the thermal imaging camera.

Body temperature for humans and livestock is based on the temperature inside the rectum, which is located inside the anus. In most cases, the temperature inside the rectum of the body is constant and there is little influence from the outside world, so medically, the temperature inside the rectum is the standard.

However, since it is impossible to directly measure the temperature inside the rectum of the body, as an alternative, for example, in humans, the temporal arteries with a large amount of blood pass through the forehead of the face. Since the temporal arteries are connected to the hypothalamus of the brain, which controls body temperature, the body part with the highest accuracy when measuring body temperature is the forehead of the face.

As such, when measuring body temperature in humans or livestock, it is not necessary to know information on the temperature distribution on the surface of the entire body, so measuring the body temperature of people or livestock with the thermal imaging camera as in the prior art is not accurate and inefficient.

SUMMARY OF THE INVENTION

The present invention relates to a temperature measuring device of a non-contact manner, in a simple configuration at a lower cost than a thermal imaging camera, recognizes a movable target object to be measured using a general camera, and measures the temperature of the movable target object. A temperature measuring device is provided for recognizing the position information of the movable target object and correcting an error according to a difference in distance or angle from the movable target object to enable accurate temperature measurement.

A temperature measuring device according to an embodiment of the present invention may include a camera configured to acquire an image within a field of view; an image-processor configured to detect a target object corresponding to a subject in real space from the image acquired by the camera and specify a target region on the target object; a sensing tracker configured to measure position information of a target position on the target region on the subject while tracking the subject and sense infrared radiation irradiated by the subject based on the target position; and a controller configured to control the sensing tracker according to the target position and calculate a temperature of the subject using the position information and the infrared radiation sensing information.

Preferably, the image-processor is configured to process using artificial intelligence for discriminating by learning whether the object detected from the acquired image is a human, a specific livestock, or a specific stuff, and the image-processor is configured to find and specify a target region according to a corresponding type according to the type of the detected object.

Preferably, the image-processor is configured to detect a person as the object from the acquired image, recognize a part of the detected person object, and specify the recognized part as the target region, wherein the sensing tracker is configured to measure position information of a point on the target region specified by the image-processor for each frame acquired by the camera, and sense infrared radiation based on the target region, and wherein the controller is configured to calculate the body temperature of the person by correcting the temperature according to the infrared sensing information using the measured position information of the target region.

Preferably, the image-processor is configured to detect a livestock as the object from the acquired image, recognize a part of the body of the detected livestock, and specify the recognized part as the target region, wherein the sensing tracker is configured to measure position information of a point on the target region specified by the image-processor for each frame acquired by the camera, and sense infrared radiation based on the target region, and wherein the controller is configured to calculate the body temperature of the livestock by correcting the temperature according to the infrared sensing information using the measured position information of the target region.

Preferably, the image-processor is configured to detect a specific item as the object from the acquired image, recognize a part of the item, and specify the part as the target region, wherein the sensing tracker is configured to measure position information of a point on the target region specified by the image-processor for each frame acquired by the camera, and sense infrared radiation based on the target region, and wherein the controller is configured to calculate the temperature of the item by correcting the temperature according to the infrared sensing information using the measured position information of the target region.

Preferably, the sensing tracker includes a sensing module configured to collect information for calculating the temperature of the subject, and an actuator configured to rotate or move the sensing module so as to aim at a target position which is a point on the target region of the subject under the control of the controller.

Preferably, the controller presets mapping information on a coordinate system of the camera and a coordinate system in real space through a calibration of the camera, and the controller controls the actuator so that the sensing module aims at a target position on the target region of the subject corresponding to the target region of the target object on the image specified by the image-processor.

Preferably, the sensing tracker includes, a sensing module including a light pointer for irradiating light to a target position on the target region of the subject; a position detector for measuring distance information about the target position using light of the light pointer reflected from the target region; and an infrared sensor for sensing infrared radiation irradiated from the target region, and the sensing tracker also includes an actuator configured to rotate or move the sensing module so that the sensing module aims at the target position under the control of the controller.

Preferably, the controller is configured to calculate a position change of the object detected by the image-processor for each of the frames acquired by the camera, and control the actuator according to the calculated position change of the subject, so that the sensing module aim the target position of the subject, and the controller is configured to measure the subject multiple times using the sensing module tracking the target position of the subject, compensate the infrared sensing information from the subject according to distance or angle information using each measurement result, and calculate the temperature of the subject a plurality of times while tracking the position change of the target position of the subject.

Preferably, plurality of objects including a first object and a second object are detected by the image-processor in the acquired image, and while the sensing tracker tracks a first subject corresponding to the first object and collects information on temperature calculation for the first subject, and the controller calculates the temperature for the first subject using the collected information and performs a fever check for the first subject, and after the fever check of the first subject, while the sensing tracker tracks a second subject corresponding to the second object and collects information on temperature calculation for the second subject, and the controller calculates the temperature for the second subject using the collected information and performs a fever check for the second subject.

A temperature measuring device according to another embodiment of the present invention may include a camera configured to acquire an image within a field of view; an image-processor configured to detect a plurality of target objects corresponding to a plurality of subjects from the image acquired by the camera and specify a target region on each of the plurality of the target objects; a plurality of sensing trackers each of which is configured to measure position information of each target position on each of the target regions tracking each of the plurality of the subjects and sense infrared radiation irradiated by each of the plurality of the subjects based on each of the target positions; and a controller configured to control each of the plurality of the sensing trackers according to each of the target positions of the subjects and calculate temperature of each of the plurality of the subjects using the position information and the infrared radiation sensing information.

Preferably, each of the plurality of the sensing trackers includes a sensing module including a light pointer that irradiates light to a target position on the target region of the subject matched with the sensing module, a position detector that measures distance information on the target position on the matched subject, and an infrared sensor that senses infrared radiation irradiated from the target position of the matched subject; and an actuator that rotates or moves the sensing module to aim at the target position of the matched subject under the control of the controller.

Preferably, the plurality of the sensing trackers include a first sensing tracker and a second sensing tracker, the image-processor detects a plurality of objects including a first object and a second object from the acquired image, the controller matches a first subject corresponding to the first object to the first sensing tracker, and matches a second subject corresponding to the second object to the second sensing tracker, the first sensing tracker collects temperature calculation information for the first subject while tracking the first subject, and the second sensing tracker collects temperature calculation information for the second subject while tracking the second subject, and the controller calculates a temperature for the first subject and a temperature for the second subject, respectively, using the collected information.

A control method for temperature measuring according to an embodiment of the present invention may include acquiring an image within a field of view by the camera; detecting a target object corresponding to a subject from the acquired image and specifying a target region of the target object; controlling an actuator that rotates or moves the sensing module so that the sensing module aims at a target position on a target region of the subject corresponding to the target region on the image; measuring position information of the target position on the target region of the subject tracking the subject by the sensing module and sensing infrared radiation based on the target position; and calculating a temperature of the target region of the subject using the position information and the infrared sensing information.

Preferably, the method further includes presetting information on mapping for a coordinate system of the camera and a coordinate system in real space through a calibration for the camera, and wherein the controlling the actuator includes, calculating position information of the target position on the target region of the subject corresponding to the target region of the target object on the image by the preset mapping information, and controlling the actuator so that the sensing module aims at the calculated target position of the subject in real space.

Preferably, the measuring position information includes, irradiating light to the target position on the target region of the subject using a light pointer, measuring distance information for the target position using a position detector, and sensing infrared radiation irradiated from the subject in real space based on the target position using an infrared sensor.

The temperature measuring device according to the present invention as described above is related to a non-contact type temperature measuring device, and have a simple configuration that is cheaper than a thermal imaging camera. There is an effect of measuring the temperature of a target, recognizing position information on the movable target object, and correcting an error according to a difference between a distance and an angle from the movable target object using this information, thereby enabling accurate temperature measurement.

DESCRIPTION OF THE PREFERRED EMBODIMENTS

Figure 1:
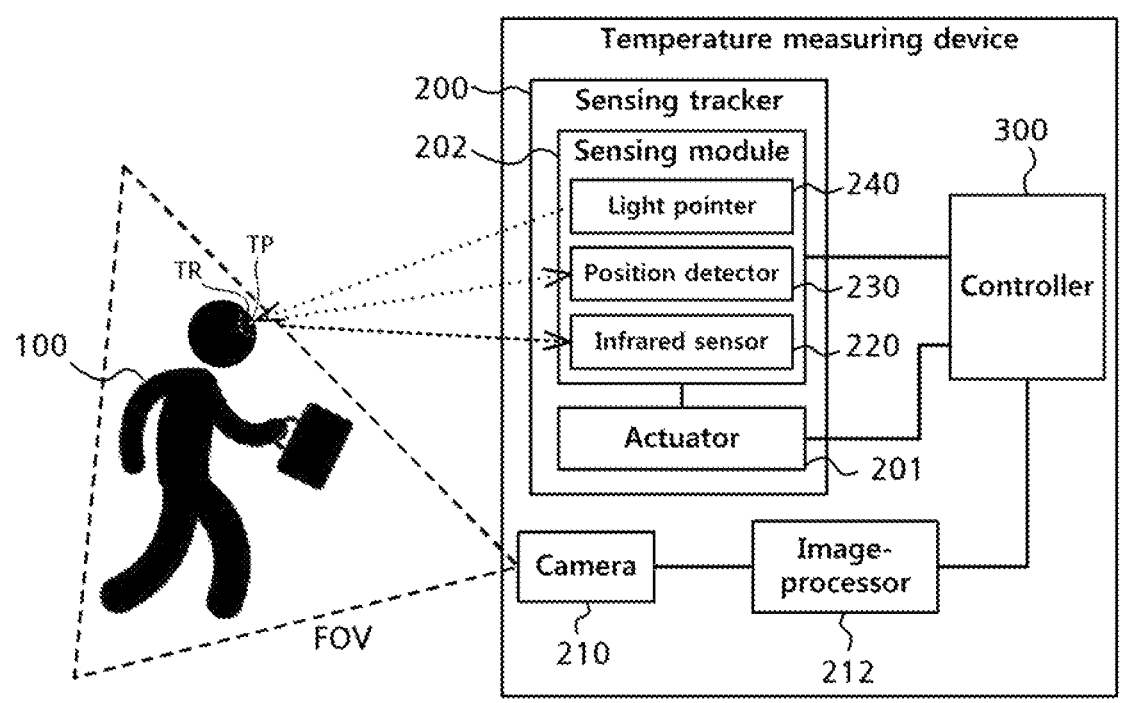
FIG. 1 is a block diagram showing the configuration of a temperature measuring device according to an embodiment of the present invention.

The terms used in the present specification will be briefly described, and the present invention will be described in detail.

Terms used in the present invention have selected general terms currently widely used as possible while taking functions in the present invention into consideration, but this may vary depending on the intention or precedent of a technician engaged in the relevant field, the emergence of new technologies, and the like. In addition, in certain cases, there are terms arbitrarily selected by the applicant, and in this case, the meaning of the terms will be described in detail in the description of the corresponding invention. Therefore, the terms used in the present invention should be defined based on the meaning of the term and the overall contents of the present invention, not a simple name of the term.

When a part of the specification is said to "include" a certain element, it means that other elements may be further included rather than excluding other elements unless specifically stated to the contrary. In addition, terms such as "unit" and "module" described in the specification mean units that process at least one function or operation, which may be implemented as hardware or software, or as a combination of hardware and software.

Hereinafter, a temperature measuring device and control method thereof according to the present invention will be described in detail with reference to the drawings.

The present invention relates to a non-contact temperature measuring device, and a thermal imaging camera is generally widely used for non-contact temperature measurement. The general camera reacts to visible light reflected from the subject, and the image sensor generates an image of the subject. Similarly, in the thermal imaging camera, the infrared image sensor generates an image of the temperature distribution of the surface of the subject in response to infrared radiation irradiated from the subject.

However, when performing a fever check on a person or livestock, that is, whether the body temperature of a person or livestock has a higher body temperature than the normal body temperature, knowing the temperature distribution information of the entire body of a person or livestock with a thermal imaging camera is unnecessary.

In fact, in the case of humans or livestock, when checking whether they are infected with a disease accompanying fever or not, it may measure the temperature by contacting the forehead of a person or the head of a livestock with a contact temperature measuring instrument, and whether the measured temperature is higher than the normal value.

Body temperature for humans and livestock is based on the temperature inside the rectum, which is located inside the anus. In most cases, the temperature inside the rectum of the body is constant and there is little influence from the outside world, so medically, the temperature inside the rectum is the standard.

However, since it is impossible to directly measure the temperature inside the rectum of the body, as an alternative, for example, in humans, the temporal arteries with a large amount of blood pass through the forehead of the face. Since the temporal arteries are connected to the hypothalamus of the brain, which controls body temperature, the body part with the highest accuracy when measuring body temperature is the forehead of the face.

In this way, when measuring body temperature for humans or livestock, it is not necessary to provide information on the temperature distribution of the whole body by a thermal imaging camera, and more accurate body temperature measurement results can be obtained by intensively measuring the temperature of a specific part of the body as a target region.

Even in the case of a non-contact temperature measuring device, especially when performing a fever check, it is preferable to perform a fever check by measuring the temperature of a specific target region for a subject to be measured.

A configuration of a temperature measuring device according to an embodiment of the present invention will be described with reference to FIG. 1. FIG. 1 is a block diagram showing the configuration of a temperature measuring device according to an embodiment of the present invention.

The temperature measuring device according to an embodiment of the present invention includes a camera 210, an image-processor 212, a sensing tracker 200, a controller 300 as shown in FIG. 1.

The camera 210 acquires an image including a movable subject 100, which is a target of temperature measurement, at a predetermined field of view.

The camera 210 may be a digital camera that acquires a conventional color image, has a field of view capable of capturing the subject 100 within a predetermined range in which the subject 100 may move. It may be an image capturing device capable of acquiring images in a predetermined frame per second (fps).

The camera 210 may be a camera used for a vision sensor that senses the motion characteristics of a moving subject through image capture, and may be a camera that acquires an image in gray scale. It does not have to be a camera that acquires a thermal image by infrared rays radiated from the subject.

Meanwhile, the image-processor 212 analyzes the image acquired by the camera 210, detects the movable target object corresponding to the subject 100 from the image, and sets a preset part of the target object to the target region corresponding to a target region TR of the subject 100, which is the target area for temperature measurement.

The image-processor 212 may constitute a device together with the camera 210, and may be provided separately from the camera 210 and implemented as hardware that receives and processes image data from the camera 210, or as a partial function of the controller 300.

The image-processor 212 is an element that receives an image from the camera 210 and finds a target object for temperature measurement in the image. The target object may be a person as an object that can move or move quickly or slowly, livestock, or a specific item.

The image-processor 212 may find and extract a target object through a process based on an algorithm programmed to extract a target object for temperature measurement from an image.

That is, the image-processor 212 processes the image received from the camera using a predetermined image processing technique with preset information on the characteristics of the target object to be extracted from the image of the camera, and the target object can be found and extracted from an image based on preset information on the characteristics of the target object.

For example, the image-processor uses the image of the previous frame as a reference image, and extracts moving objects for each frame image through an image difference with the reference image for each image of a plurality of frames.

Since it has not been determined which of the extracted objects is the target object, these are called object candidates.

For each of the extracted object candidates, the image-processor selects an object candidate matched the characteristics of the target object known in advance (for example, when the target object is a human, features related to the human body, geometric features related to the face, etc.) as the target object. For example, the image-processor stores predetermined information on features related to the shape of the head, body, arms, legs, etc. By finding a matching part, an object candidate corresponding to a person can be extracted, and a part corresponding to a face can be found and extracted from the extracted object.

If the target object to be extracted by the image-processor is livestock, features related to the body and head of livestock are stored in advance, and based on the feature information, an object candidate matching the feature information among object candidates can be selected as the target object.

In the case of humans, fever can be checked by measuring the temperature of the forehead. In the case of livestock, for example, in the case of pigs, fever can be checked by measuring the temperature of the head or abdomen.

As described above, the image-processor can also extract a target object corresponding to a subject of measurement from an image and specify a target region as a part to measure temperature in the target object. When the image-processor extracts a person as the target object, when the image-processor extracts a person as the target object, the forehead of the person can be found and specified as the target region. Similarly, when the image-processor extracts livestock as the target object, the head or abdomen of the livestock can be found and specified as the target region.

If the target object is a human, the target region is not necessarily defined to the forehead, but can be specified as various parts, such as the cheek or neck, and in the case of livestock, it can be specified not only the head or abdomen, but also various parts such as the back or hips.

In the case that the object is a human, if some parts such as the forehead is covered according to the hair style or clothing style, the image-processor may find a body part that can measure temperature and specify that part as a target region.

The target region, which is the standard part of temperature measurement on the target object, is not defined to one specific part, but can be set by the image-processor.

However, as described above, there are some limitations when implementing the image-processor 212 by programming an algorithm that extracts a target object from an image.

For example, in the case of extracting a person as a target object and recognizing a face from it, it is very difficult to extract a person object from an image due to a wide variety of clothing styles and hair styles, and it may be very difficult to recognize a person's face. For example, a person who has a body style, clothing style, or hair style that is not programmed in the image-processor cannot be extracted from the image by the image-processor, and recognition errors may occur.

Meanwhile, artificial intelligence capable of automatically recognizing an object from an image may be applied to the image-processor 212. Deep learning artificial intelligence can be used for object recognition on the image.

The deep learning artificial intelligence uses a deep learning model that learns objects about humans, livestock, items, etc. from images, and learns about various data, it is possible to recognize various objects from an image as if a person sees an image and recognizes the background and objects.

As described above, the image-processor equipped with artificial intelligence can distinguish the background and the object from the image and distinguish whether it is an animal or a stuff by learning, even if the image acquired from the camera is not subjected to image processing such as separating the background. When a person is recognized as an object, the image-processor can distinguish which part of the human object is a face, which part of the face is an eye, a nose or a forehead, etc. through learning.

In addition, when the image-processor recognizes a person as an object, it may be determined which part is to be specified as a target region, which is a reference for measuring temperature, in consideration of the person's clothing styles and hair styles.

For example, in the case of a human object, if a part of the face is covered depending on whether or not hair styles, clothing styles, or mask is worn, the artificial intelligence of the image-processor can find a body part that can measure temperature and specify that part as a target region to be measured.

The target region, which is the standard part of temperature measurement on the target object, is not defined to one specific part, and the part determined by the artificial intelligence of the image-processor that temperature measurement is possible by learning can be specified as the target region.

The temperature measurement apparatus according to an embodiment of the present invention may include an image-processor that extracts an object on an image by a pre-programmed algorithm based on the feature information of the object as described above, or may include an image-processor equipped with artificial intelligence that automatically recognizes objects.

The image-processor 212 may detect a target object from an image acquired by the camera 210 and specify a target region, which is a preset portion on the target object.

For example, the image-processor 212 can recognize a human object as a target object in an image by artificial intelligence, and can recognize the forehead of the human object as a target region, and a point on the forehead of the human object can be specified as a target position.

In addition, for example, the image-processor 212 can recognize a pig object as a target object in an image by artificial intelligence, recognize a head as a target region in the pig object, and specify a part of the head as a target position.

Meanwhile, the temperature measuring apparatus according to an embodiment of the present invention may include a sensing tracker 200 as shown in FIG. 1. The sensing tracker 200 measures the position information of the target position TP, which is a point on the target region TR in real space, according to the movement of the subject corresponding to the target object on the image recognized by the image-processor 212. And it may be configured to sense infrared radiation irradiated from the target region TR.

For example, when a human object is extracted as the target object and the forehead of the human object's face is specified as a target region, the sensing tracker 200 is controlled to aim at the forehead of a person in real space corresponding to the human object, and senses the position of the forehead part in real space and infrared radiation irradiated from the forehead part.

At this time, if the person moves, the movement is detected by the camera 210 and the image-processor 212, and the sensing tracker 200 can be controlled to track the moving person while aiming the person's forehead.

The sensing tracker 200 may include a sensing module 202 and an actuator 201 as shown in FIG. 1.

The actuator 201 may rotate or move the sensing module 202 so that the sensing module 202 aims at a target position TP of the subject 100 which is corresponding to the target object on the image, under the control of the controller 300.

The actuator 201 may rotate or move the sensing module 202 using one or more motors or a motor and a gear device.

The actuator 201 may rotate or move the sensing module 202 so that the sensing module 202 can aim at any point within a field of view of the camera 210.

The sensing module 202 is an element that collects information for measuring temperature of the target region TR of the subject 100, and may include an infrared sensor 220, a position detector 230, and a light pointer 240.

The light pointer 240 is an element that irradiates light in a predetermined direction, and according to an embodiment may be a device that irradiates a laser beam in a predetermined direction.

When the image-processor 212 specifies the coordinates of the target position on the target object through image analysis, the controller 300 may calculate the coordinates in real space corresponding to the coordinates of the target position.

The controller 300 can rotate the sensing module 202 by controlling the actuator 201 according to the calculated coordinates on real space. In the rotated posture, the light pointer 240 irradiates light in a predetermined direction, and a point at which the light pointer 240 irradiates light becomes an aiming point, and the aiming point becomes a target position on the subject.

Meanwhile, as described above, after the light pointer 240 irradiates light, the irradiated light reaches the subject and is reflected back. The reflected light can be received by the position detector 230.

The position detector 230 already knows the information on the energy of light when the light pointer 240 is irradiated, and detects the energy of the reflected light. Distance information to the point at which pointer 240 aims, that is, the target position in real space, can be calculated.

The infrared sensor 220 may detect infrared radiation irradiated from the subject and generate an electric signal corresponding to the intensity of the detected infrared radiation. An electric signal according to infrared detection by the infrared sensor 220 is transmitted to the controller 300, and the controller 300 may calculate the temperature of the subject according to the electric signal.

All subjects, whether living things or objects, irradiate infrared radiation according to the degree of self-heating, and the infrared sensor detects the infrared radiation irradiated by the subject.

However, energy loss occurs due to the influence of air and surrounding temperature while infrared radiation irradiated from the subject reach the infrared sensor, so even if multiple subjects have the same temperature, it can be measured with different temperature values depending on the infrared radiation according to the distance and angle between the subject and the infrared sensor.

When the A subject and B subject have the same temperature and the distance from the infrared sensor to the A subject is farther than the distance from the infrared sensor to the B subject, although the A subject and B subject actually have the same temperature, since the infrared sensor received from the A subject and the infrared characteristic received from the B subject are different according to the distance difference, an error may occur that the temperature measured value of the A subject becomes lower than the temperature measured value of the B subject.

Therefore, it is not preferable to calculate the temperature of the subject based only on what is sensed by the infrared sensor, and it is preferable that the position information of the subject including the distance and angle between the subject to be measured temperature and the infrared sensor is reflected in the subject's temperature calculation.

That is, when measuring the temperature of the subject, the infrared sensor detects infrared radiation irradiated from the subject and the temperature value calculated accordingly is corrected according to the position information of the subject relative to the infrared sensor, so that the final temperature value can be calculated.

In the temperature measuring device according to an embodiment of the present invention as shown in FIG. 1, if the target region TR and the target position TP on the subject 100 are specified by image analysis of the image-processor, the actuator 201 controlled by the controller 300 can let the sensing module 202 rotate so as to aim at the target position TP. In addition to the infrared sensor 220 sensing infrared radiation irradiated from the target region TR of the subject, the light pointer 240 positions a light spot at the target position TP, and the position detector 230 that receives the reflected light from the target position TP can measure the distance between the sensing module 202 and the target position TP.

The controller 300 can correct the sensing value based on the sensing value of the infrared sensor 220 using distance information detected by the position detector 230, and angle information according to the rotation of the actuator 201, accordingly the temperature can be finally calculated.

Meanwhile, an operation mechanism of the temperature measuring device according to an embodiment of the present invention will be described with reference to FIG. 2.

Figure 2:
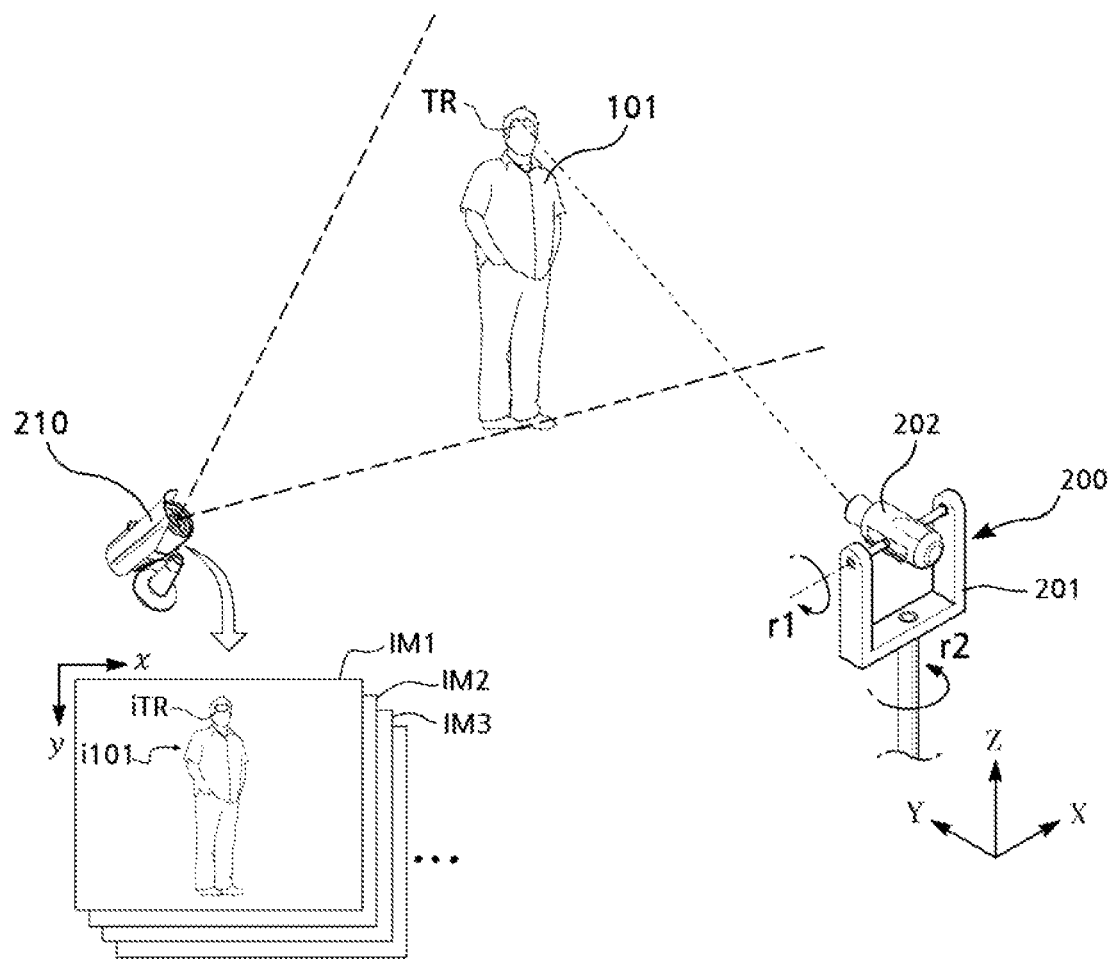
FIG. 2 shows for explaining a case of measuring a person's body temperature in a non-contact manner using the temperature measuring device shown in FIG. 1.

In the embodiment shown in FIG. 2, the temperature measuring device measures a person's body temperature in a non-contact manner.

As shown in FIG. 2, the temperature measuring device according to an embodiment of the present invention includes a camera 210 and a sensing tracker 200. Although not shown in the drawing, an image-processor that analyzes an image to recognize an object and a controller that controls the sensing tracker 200 and calculates a temperature may be further included.

As shown in FIG. 2, the sensing tracker 200 may include an actuator 201 and a sensing module 202. The sensing module 202 can rotate or move by the actuator 201. For example, as shown in FIG. 2, the actuator 201 rotates the sensing module 202 in the direction r1 and/or in the direction r2, causing the sensing module 202 to aim at any point within the field of view of the camera.

The rotation in the r1 direction and the rotation in the r2 direction of the actuator 201 may include a motor for driving each rotation, and the rotation of the r1 and r2 may be driven using a single motor and a gear device.

The rotation of the sensing module 202 by the actuator 201 can be defined by the coordinate system of X-Y-Z as a coordinate system in real space (world coordinate system), and the position of the target position aimed by the sensing module 202 can also be defined according to the coordinate system of X-Y-Z.

Meanwhile, the camera 210 uses a camera coordinate system different from the X-Y-Z coordinate system, and may be defined by an x-y coordinate system (pixel-based coordinate system).

The camera 210 acquires a plurality of frames of images (IM1, IM2, IM3, etc.) including the person 101, and the image-processor detects an object corresponding to the person 101 by analyzing the images of each frame.

For example, as shown in FIG. 2, the object i101 corresponding to a person may be detected in the IM1 image. This can be detected by an algorithm pre-programmed in the image-processor, or by recognizing an object corresponding to a person based on the data learned by the artificial intelligence operated in the image-processor.

When the image-processor specifies the human object i101 on the image (IM1), for example, the forehead as the target region iTR, the center point or an arbitrary point of the target region iTR can be specified as the target position, and the position coordinate of the target position on the image is referred to as (x1, y1).

The controller can specify the forehead of a person in the real space corresponding to the target region iTR on the image as a target region TR on the subject, and a target position by the X-Y-Z coordinate system in real space corresponding to the coordinates (x1, y1) of a target position on the image. By calculating the coordinates of the position and controlling the actuator 201, the sensing module 202 can be rotated to aim at the target position by the X-Y-Z coordinate system.

At this time, it is possible for the sensing module 202 to directly aim the target position according to the X-Y-Z coordinate system corresponding to the coordinate of the target position on the image without specifying the target region TR on the subject in real space corresponding to the target region iTR on the image.

Here, the controller needs to know in advance information about the correlation between the camera coordinate system (x-y coordinate system) and the real space coordinate system (X-Y-Z coordinate system).

For example, the controller may pre-store information on a transformation matrix that can convert a coordinate value from a camera coordinate system (x-y coordinate system) into a coordinate value according to a coordinate system (X-Y-Z coordinate system) in real space, and using the transformation matrix, the coordinate values of the x-y coordinate system can be converted into coordinate values of the X-Y-Z coordinate system.

By calibrating the camera 210 to define the correlation between the camera coordinate system (x-y coordinate system) and the real space coordinate system (X-Y-Z coordinate system) as described above, the controller may pre-set information on the correlation between the different coordinate systems.

The setting of the correlation of the coordinate system transformation by calibration as described above can be described with reference to FIG. 4.

Figure 4:
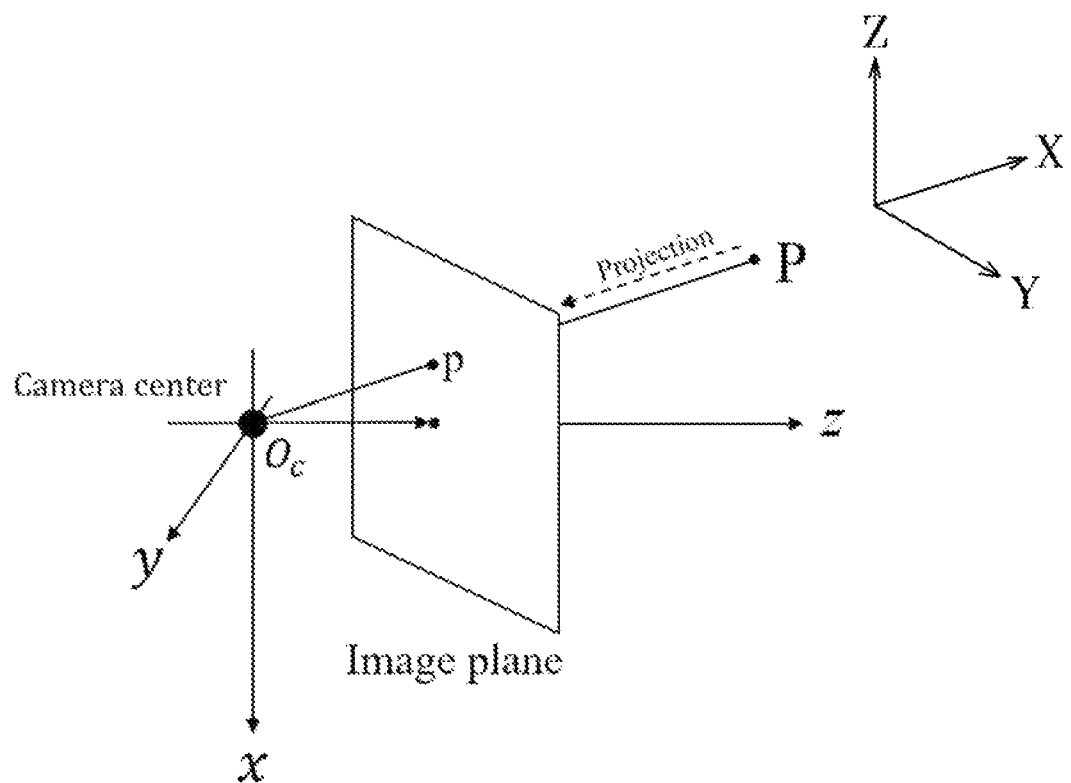
FIG. 4 shows for explaining that the coordinates of points in real space are converted into one pixel point in the camera coordinate system through calibration of the camera of the temperature measuring device shown in FIG. 1.

In FIG. 4, the coordinates of points in real space are converted into one pixel point in the camera coordinate system through calibration of the camera.

FIG. 4 shows that the camera generates by projecting one pixel point p(x, y) on the image plane at the focal length based on the camera center point Oc from the point P(X, Y, Z) in real space.

As shown in FIG. 4, the camera can acquire an image by mapping a point P(X, Y, Z) on the three-dimensional space coordinate system to one pixel point p(x, y) on the two-dimensional image coordinate system. Using a homogeneous coordinate system, it is possible to calculate a transformation relationship between an image coordinate system and a real spatial coordinate system.

The homogeneous coordinate system expresses two-dimensional coordinates as three-dimensional coordinates, and when using this, a point p(x, y) on an image coordinate system, which is a two-dimensional coordinate system, can be converted to a point P(X, Y, Z) in real space.

Here, a transformation matrix for converting a point p(x, y) on an image coordinate system, which is a two-dimensional coordinate system, to a point P(X, Y, Z) on a coordinate system in real space, which is a three-dimensional coordinate system may be calculated.

As described above, if the controller calculates the transformation matrix through camera calibration, it can be used to convert the coordinate value of the x-y coordinate system into the coordinate value of the X-Y-Z coordinate system.

As shown in FIG. 2, the controller may calculate the coordinates of the target position according to the X-Y-Z coordinate system in real space corresponding to the coordinates (x1, y1) of the target position on the image using the transformation matrix.

The controller can control the actuator 201 to rotate the sensing module 202 to aim the target position by the X-Y-Z coordinate system.

In this way, target object i101 can be detected from each of the multiple frames of images (IM1, IM2, IM3, etc.) acquired by the camera 210, and the coordinates of each target position on the image can be converted to target position in real space using the transformation matrix. By converting the coordinates of the sensing module 202 to the target position in real space, when the person 101 moves, the sensing module 202 can measure the body temperature of the person tracking the movement of the person.

Meanwhile, an operation mechanism of a temperature measuring device according to another embodiment of the present invention can be described with reference to FIG. 3.

Figure 3:
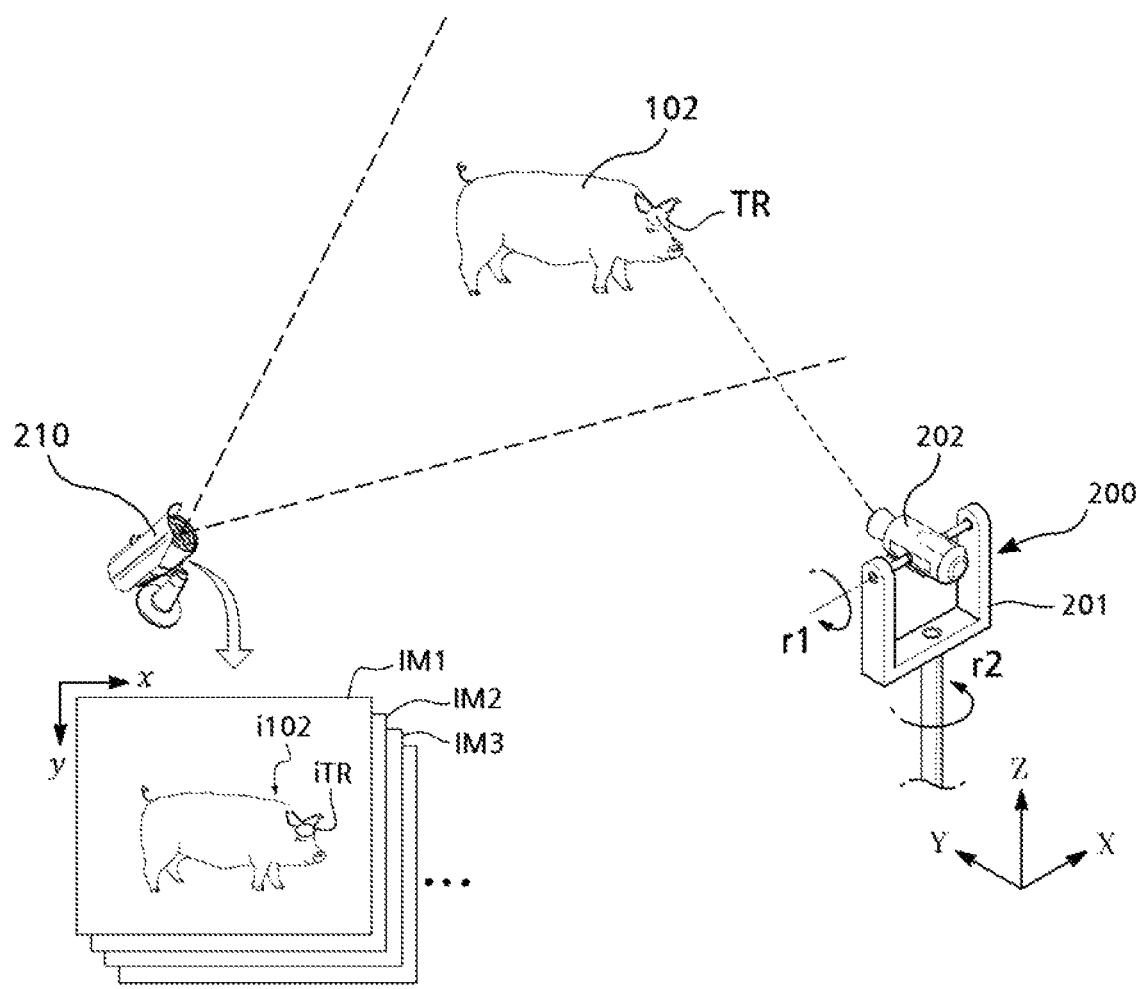
FIG. 3 shows for explaining a case of measuring the body temperature of a livestock in a non-contact manner using the temperature measuring device shown in FIG. 1.

In the embodiment shown in FIG. 3, the temperature measuring device measures the body temperature of livestock, that is, pigs in a non-contact manner.

FIG. 3 has substantially the same configuration and operation mechanism as the embodiment shown in FIG. 2, except that the subject of temperature measurement is a pig.

As shown in FIG. 3, the actuator 201 rotates the sensing module 202 in the r1 direction and/or the r2 direction so that the sensing module 202 can aim at an arbitrary point within a field of view.

The rotation of the sensing module 202 by the actuator 201 can be defined by the coordinate system of X-Y-Z as a coordinate system (world coordinate system) in real space, and the target position aimed by the sensing module 202 can also be defined according to the coordinate system of X-Y-Z.

Meanwhile, the camera 210 uses a camera coordinate system as a coordinate system different from the X-Y-Z coordinate system, and may be defined by an x-y coordinate system (pixel-based coordinate system).

The camera 210 acquires multiple frames of images (IM1, IM2, IM3, etc.) including the pig 102, and the image-processor detects an object corresponding to the pig by analyzing the images of each frame.

For example, as shown in FIG. 3, the object i102 corresponding to a pig may be detected in the IM1 image. This can be detected by an algorithm programmed in advance in the image-processor, or by recognizing the object corresponding to the pig based on the data learned by the artificial intelligence installed in the image-processor.

If the image-processor specifies the head of the pig object i101 on the image (IM1) as the target region iTR, the center point or an arbitrary point of the target region iTR can be specified as the target position, and the position coordinates of the target position on the image will be referred as (x2, y2).

The controller can specify the pig's head in real space corresponding to the target region iTR on the image as the target region TR, and the target by the X-Y-Z coordinate system in real space corresponding to the coordinates (x2, y2) of the target position on the image. The coordinates of the position are calculated, and the actuator 201 is controlled to rotate the sensing module 202 so that the sensing module 202 aims at the target position by the X-Y-Z coordinate system.

In this way, target object i102 can be detected from each of the multiple frames of images (IM1, IM2, IM3, etc.) acquired by the camera 210 and the coordinates of each target position on the image are converted to target position in real space using the transformation matrix. By converting to the coordinates of and allowing the sensing module 202 to aim at the target position in real space, when the pig 102 moves, the sensing module 202 can track the movement and measure the body temperature of the pig.

Figure 5:
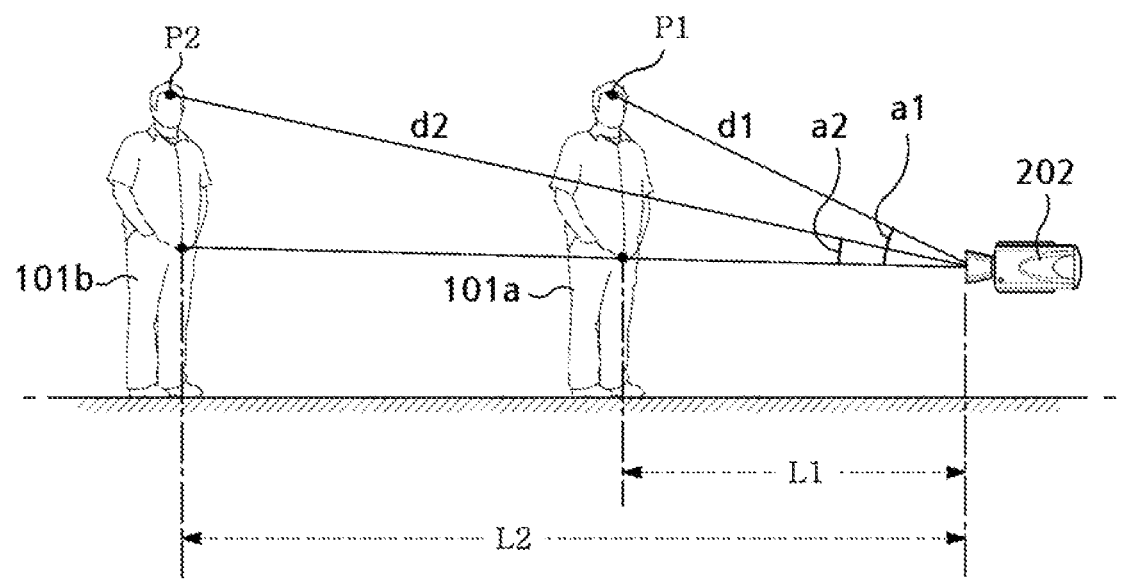
FIG. 5 shows for explaining the calculation of temperature for each position of a subject by a sensing module of the temperature measuring device shown in FIG. 1.
Figure 5:
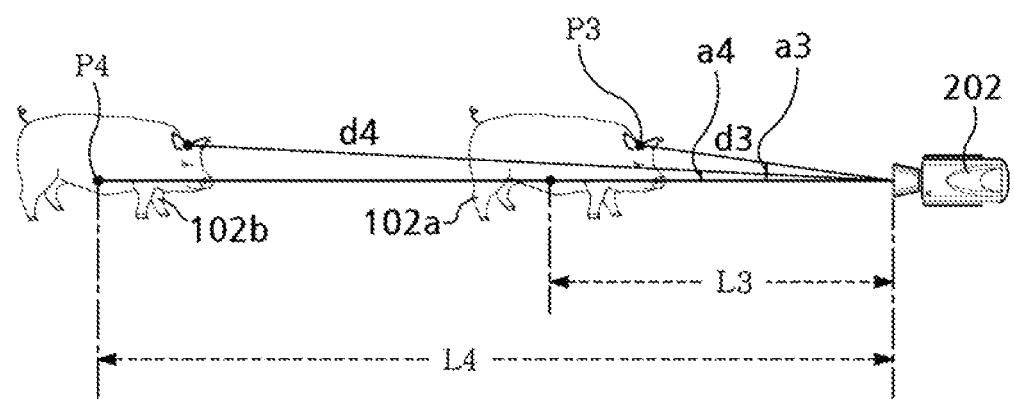

Meanwhile, with reference to FIG. 5, the temperature measuring device according to an embodiment of the present invention can be described with respect to calculation of temperature of the subject for each position by a sensing module.

In FIG. 5, (a) is a view showing a case of measuring temperatures of persons in different positions, and (b) is a view showing a case of measuring temperature of pigs in different positions.

As shown in FIG. 5(a), when the first person 101a and the second person 101b are respectively located at different positions, and when the forehead of each person is the target position, the infrared sensor of the sensing module 202 senses infrared radiation irradiated from each of the first person 101a and the second person 101b.

However, since the second person 101b is located farther from the sensing module 202 than the first person 101a, when it is assumed that the first person 101a and the second person 101b have the same body temperature, if the body temperature of each person is measured only by the sensing result of the infrared sensor, a relatively distant second person 101b may have a lower body temperature than the first person 101a.

Therefore, the light pointer of the sensing module 202 irradiates the light to the target position P1 of the first person 101a, the position detector receives the reflected light to obtain the distance d1, and irradiates the light to the target position P2 of the second person 101b, and the position detector receives the reflected light and finds the distance d2.

As the actuator lets the sensing module 202 rotate so as to aim at each target position P1 and P2, the angle a1 according to aiming at the target position P1 and the angle a2 according to aiming at the target position P2 can be calculated, respectively.

As described above, the distance L1 to the first person 101a can be obtained from the distance d1 and the angle a1 to the target position of the first person 101a, and the distance L2 to the second person 101b can be obtained from the distance d2 and the angle a2 to the target position of the second person 101b by the light pointer, position detector, and actuator.

The controller of the present invention calculates the temperature value of the first person 101a according to the value sensed by the infrared sensor for the first person 101a, and corrects the calculated temperature value by considering the distance L1 to the first person 101a. The final temperature can be calculated by correction.

In addition, the controller of the present invention calculates the temperature value of the second person 101b according to the value sensed by the infrared sensor for the second person 101b, and considers the distance L2 to the second person 101b. The final temperature can be calculated by correction.

In this way, by calculating the temperature in a way that corrects the value sensed by the infrared sensor using the distance and angle information for each subject, it is possible to accurately calculate the temperature for the subject regardless of the distance of the subject to the sensor.

Meanwhile, as shown in FIG. 5(b), when the first pig 102a and the second pig 102b are respectively located at different positions, and when the head of each pig is the target position, the infrared sensor of the sensing module 202 senses infrared radiation irradiated from each of the first pig 102a and the second pig 102b.

However, since the second pig 102b is located farther from the sensing module 202 than the first pig 102a, when it is assumed that the first pig 102a and the second pig 102b have the same body temperature, if the body temperature of each pig is measured only by the sensing result of the infrared sensor, a relatively distant second pig 102b may have a lower body temperature than the first pig 102a.

Therefore, the light pointer of the sensing module 202 irradiates the light to the target position P3 of the first pig 102a, the position detector receives the reflected light to obtain the distance d3, and irradiates the light to the target position P4 of the second pig 102b, and the position detector receives the reflected light and finds the distance d4.

As the actuator lets the sensing module 202 rotate so as to aim at each target position P3 and P4, the angle a3 according to aiming at the target position P3 and the angle a4 according to aiming at the target position P4 can be calculated, respectively.

As described above, the distance L3 to the first pig 102a can be obtained from the distance d3 and the angle a3 to the target position of the first pig 102a, and the distance L4 to the second pig 102b can be obtained from the distance d4 and the angle a4 to the target position of the second pig 102b by the light pointer, position detector, and actuator.

The controller of the present invention calculates the temperature value of the first pig 102a according to the value sensed by the infrared sensor for the first pig 102a, and corrects the calculated temperature value by considering the distance L3 to the first pig 102a. The final temperature can be calculated by correction.

In addition, the controller of the present invention calculates the temperature value of the second pig 102b according to the value sensed by the infrared sensor for the second pig 102b, and considers the distance L4 to the second pig 102b. The final temperature can be calculated by correction.

In this way, by calculating the temperature in a way that corrects the value sensed by the infrared sensor using the distance and angle information for each subject, it is possible to accurately calculate the temperature for the subject regardless of the distance of the subject to the sensor.

Meanwhile, a temperature measuring apparatus according to another embodiment of the present invention can be described with reference to FIG. 6.

Figure 6:
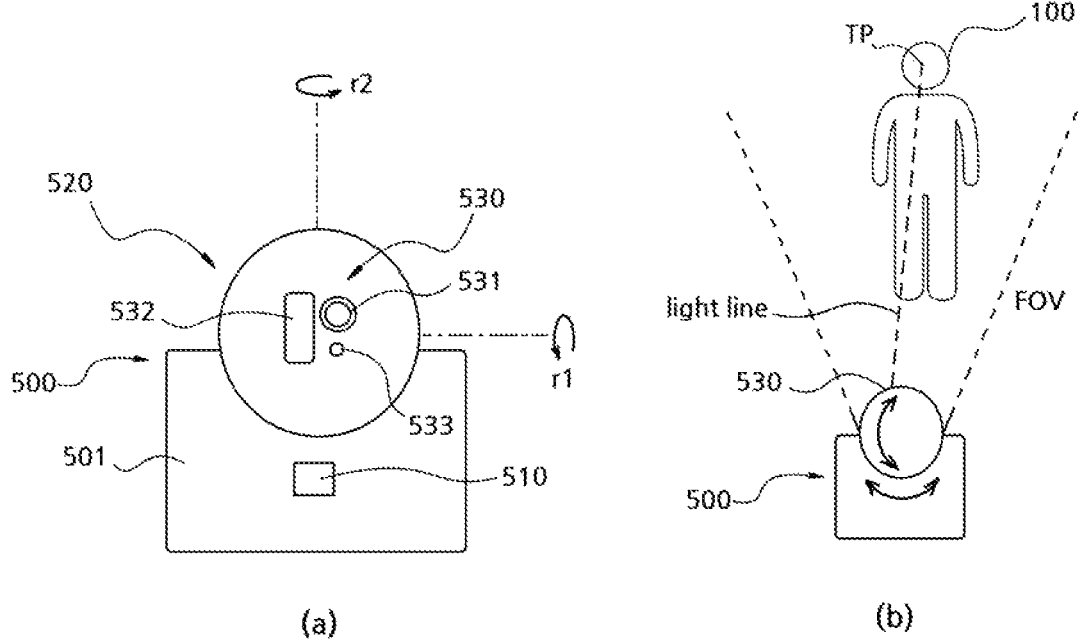
FIG. 6 shows a view (a) showing a form of a temperature measuring device according to another embodiment of the present invention, and a view (b) showing measuring body temperature for a person using the temperature measuring device shown in (a).

In FIG. 6, (a) shows a form of a temperature measuring device according to another embodiment of the present invention, and (b) shows measuring body temperature for a person using the temperature measuring device shown in (a).

The temperature measuring device according to another embodiment of the present invention basically includes substantially the same configuration of the temperature measuring device shown in FIG. 1.

As shown in FIG. 6, the temperature measuring device includes a camera 510 for acquiring an image within a field of view FOV, an image-processor for detecting a target object corresponding to a subject 100 in real space from the acquired image and specifying a target region on the target object, a sensing tracker 520 for measuring position information of a target position TP on the target region on the subject while tracking the subject 100 and sense infrared radiation irradiated by the subject 100 based on the target position TP, and a controller for controlling the sensing tracker 520 according to the target position and calculating a temperature of the subject using the position information and the infrared radiation sensing information.

The sensing tracker 520 is mounted so as to be rotatable with respect to the body 501, and may include a sensing module 530 and an actuator that rotates the sensing module 530.

The actuator may be installed inside the body 501 and configured to rotate the sensing module 530.

That is, the actuator may rotate the sensing module 530 so that the sensing module 530 aims at a target position TP in the subject 100 in real space under control of a controller.

As shown in FIG. 6(a), the sensing tracker 520 can rotate in the r1 direction and/or in the r2 direction by the internal actuator, and the sensing module 530 can aim at a specific point by such rotation.

The sensing module 530 is an element that collects information for temperature measurement on a target position TP of the subject 100 in real space as shown in FIG. 6, and includes an infrared sensor 531, a position detector 532 and a light pointer 533.

The infrared sensor 531 may detect infrared radiation irradiated from the subject and generate an electric signal corresponding to the intensity of the infrared radiation.

The light pointer 533 is an element that irradiates light in a predetermined direction, and according to an embodiment may be a device that irradiates a laser beam in a predetermined direction.

When the image-processor specifies the coordinates of the target position on the target object through image analysis, the controller calculates the coordinates in real space corresponding to the coordinates of the target position, and controls the actuator according to the calculated coordinates, thereby operating the sensing tracker 520. When a posture is determined by rotating, the light pointer 533 irradiates light in a certain direction in the designated posture, and the point at which the light pointer 533 irradiates light becomes an aiming point, and the aiming point becomes the target position TP in real space.

Meanwhile, as described above, after the light pointer 533 irradiates light, the irradiated light reaches the target position TP of the subject 100 and is reflected back. The returned light can be received by the position detector 532.

The position detector 532 knows information about the energy of light when the light pointer 533 is irradiated, and detects the energy of the reflected light, and detects the energy of the reflected light. The distance information to the point pointed by the light pointer 533, that is, the target position TP in real space, can be calculated.

As described above, the controller inside the temperature measuring device 500 may finally calculate the temperature of the subject 100 using the sensing result of the infrared sensor 531 and the measurement result of the position detector 532.

Meanwhile, an example of a method of measuring temperatures for a plurality of subjects by the temperature measuring device according to an embodiment of the present invention can be described with reference to FIG. 7.

If there is only one subject captured by the camera of the temperature measuring device, the temperature for that one subject can be measured according to the method described above. However as shown in FIG. 7, if a plurality of subjects are captured and detected simultaneously on the captured image, it must be considered how it can be processed.

As described above, when an image-processor of the temperature measuring device according to the present invention simultaneously detects a plurality of target objects corresponding to the subjects, as one method of effective temperature measurement for each subject, as shown in FIG.

7, a method of sequentially measuring the temperature by setting an order for each of a plurality of detected subjects may be provided.

Figure 7:
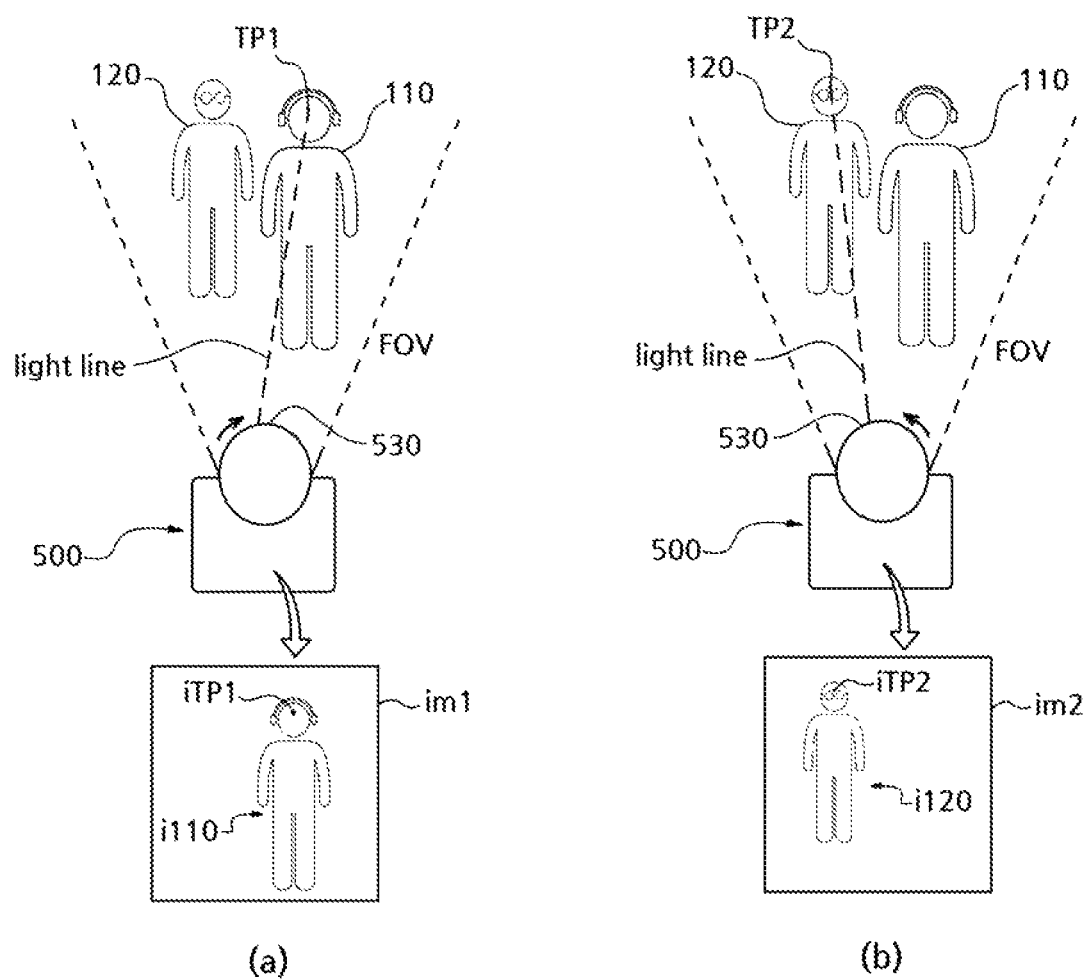
FIG. 7 shows for explaining a method of measuring temperature for a plurality of subjects using the temperature measuring device shown in FIG. 6.

In FIG. 7, (a) is a view showing preferentially measuring temperature for one of two subjects, and (b) is a view showing temperature measurement for the other one.

When the image-processor detects a plurality of target objects in an image, priority is set for each of the plurality of target objects, and the sensing module can sequentially measure temperature according to the order.

For example, the order can be determined in a manner that assigns priority to the subject closer to the camera. For example, in an image acquired by the camera, an order may be determined for each subject from left to right (or from right to left).

As shown in FIG. 7, two subjects are simultaneously detected within the field of view FOV of the camera, so that the subject closer to the camera side is referred to as the first subject 110, and the subject behind it is referred to as the second subject 120.

The image-processor of the temperature measuring device according to an embodiment of the present invention assigns first priority to a first subject 110 closer to the camera among a plurality of subjects 110 and 120 simultaneously detected from an image, and assigns the second priority to the second subject 120, the temperature can be measured in that order.

As shown in FG. 7(a), in the image im1 acquired by the camera, the image-processor can specify the target region in the part i110 corresponding to the first subject of priority, and calculate coordinates of the position of the target position iTP1 in the target region.

The controller can rotate the sensing module 530 by calculating the position coordinates of the target position TP1 in real space corresponding to the coordinates of the target position iTP1 and controlling the actuator so that the sensing module 530 aims at the target position TP1.

The light pointer of the sensing module 530 irradiates light along the light line to the target position TP1 of the first subject 110 in real space, and the sensing module 530 can measure the temperature of the first subject 110 based on the target position TP1.

The image-processor analyzes the image of multiple frames and specifies the position of the target position TP1 for the first subject 110 for each frame, and accordingly, the sensing module 530 tracks the position change even if the position of the target position TP1 changes. the subject 110 can be measured multiple times. Such multiple temperature measurements can be made in a very short time, hundreds of milliseconds.

Meanwhile, as shown in FIG. 7(a), temperature measurement for the second subject 120, which is the next priority, may proceed immediately after the temperature measurement for the first subject 110 is completed.

As shown in FG. 7(b), in the image im2 acquired by the camera, the image-processor can specify the target region in the part i120 corresponding to the second subject, and calculate coordinates of the position of the target position iTP2 in the target region.

The controller can rotate the sensing module 530 by calculating the position coordinates of the target position TP2 in real space corresponding to the coordinates of the target position iTP2 and controlling the actuator so that the sensing module 530 aims at the target position TP2.

The light pointer of the sensing module 530 irradiates light along the light line to the target position TP2 of the second subject 120 in real space, and the sensing module 530 can measure the temperature of the second subject 120 based on the target position TP2.

The image-processor analyzes the image of multiple frames and specifies the position of the target position TP2 for the second subject 120 for each frame, and accordingly, the sensing module 530 tracks the position change even if the position of the target position TP2 changes. the subject 120 can be measured multiple times.

If fever is found as a result of measuring the temperature for each subject, an alarm can be made.

The temperature measuring device according to an embodiment of the present invention may be used in connection with a display device, and a color image (not a thermal image) captured by the camera is output to the display device as it is and appears on the displayed color image. Temperature measurement information can be provided by displaying the measured temperature value for each person or livestock.

If a person or livestock with fever is found as a result of the temperature measurement, the alarm can be known by a method such as displaying the temperature value displayed for the person or livestock in a blinking red color on the display image.

Meanwhile, a temperature measuring device according to another embodiment of the present invention will be described with reference to FIG. 8.

Figure 8:
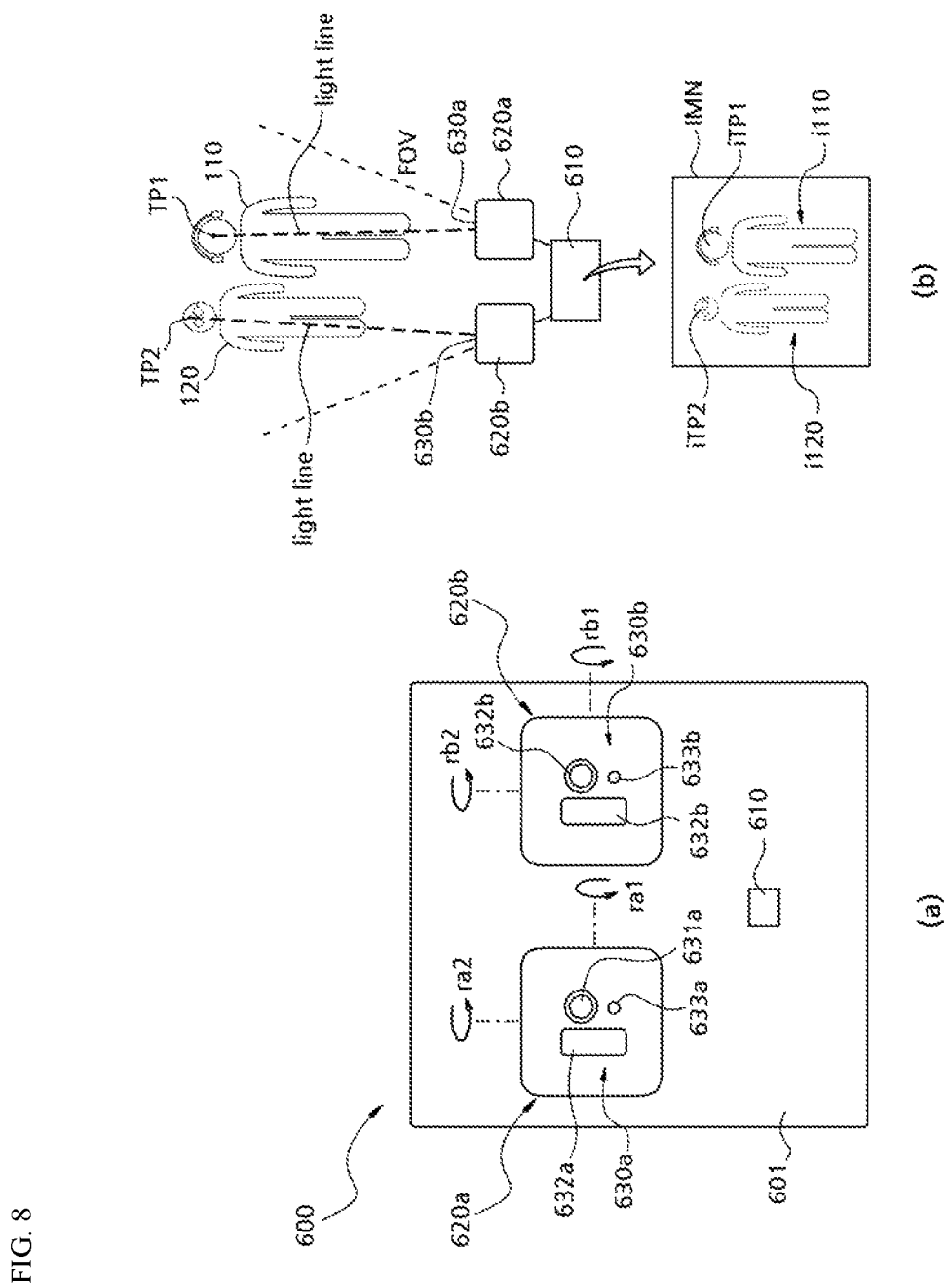
FIG. 8 shows for explaining a configuration of a temperature measuring device according to another embodiment of the present invention and a method of simultaneously measuring temperature for a plurality of subjects using the same.

When a plurality of target objects are simultaneously detected through an image acquired by a camera, the temperature measuring device 600 according to the exemplary embodiment shown in FIG. 8 may simultaneously measure temperature for each of the plurality of subjects.

FIG. 8(a) shows a form of the temperature measuring device according to another embodiment of the present invention, FIG. 8(b) shows the simultaneous measurement of temperature for each of a plurality of subjects using the temperature measuring device shown in FIG. 8(a).

As shown in FIG. 8(a), the temperature measuring device 600 may include one camera 610 and a plurality of sensing trackers 620a and 620b. In FIG. 8(a), the plurality of sensing trackers are configured as a first sensing tracker 620a and a second sensing tracker 620b. Two or more sensing trackers may be provided.

The temperature measuring device 600 according to an embodiment of the present invention shown in FIG. 8(a) includes a camera 610 for acquiring an image within a field of view FOV, an image-processor for detecting a plurality of target objects i110 and i120 corresponding to a plurality of subjects 110 and 120 from the image IMN acquired by the camera 610 and specifying a target region on each of the plurality of the target objects i110 and i120.

The device 600 also includes a plurality of sensing trackers 620a and 620b each of which is configured to measure position information of each target position TP1 and TP2 on each of the target regions tracking each of the plurality of the subjects 110 and 120 and sense infrared radiation irradiated by each of the plurality of the subjects 110 and 120 based on each of the target positions TP1 and TP2.

The device 600 also includes a controller for controlling each of the plurality of the sensing trackers 620a and 620b according to each of the target positions TP1 and TP2 of the subjects 110 and 120 and calculating temperature of each of the plurality of subjects 110 and 120 using the position information and the infrared radiation sensing information.

Each of the plurality of sensing trackers may be implemented in substantially the same configuration as the sensing tracker 520 of the temperature measuring device 500 shown in FIG. 6(*a*).

As shown in FIG. 8(*a*), the first sensing tracker 620*a* and the second sensing tracker 620*b* may be mounted to be rotatable with respect to the body 601.

When a plurality of target objects are simultaneously detected by analyzing the acquired image by the image-processor, for example, when the first subject 110 and the second subject 120 are simultaneously detected as shown in FIG. 8(*b*), the controller may match the first sensing tracker 620*a* to the first subject 110 and the second sensing tracker 620*b* to the second subject 120.

Accordingly, the first sensing tracker 620*a* collects temperature calculation information for the first subject 110 while tracking the first subject 110, and the second sensing tracker 620*b* collects temperature calculation information for the second subject 120 while tracking the second subject 120.

The controller can calculate the temperature for the first subject 110 using the information collected by the first sensing tracker 620*a*, and calculate the temperature for the second subject 120 using the information collected by the second sensing tracker 620*b*. That is, the controller may simultaneously measure the temperature of the first subject 110 and the temperature of the second subject 120.

As shown in FIG. 8, the first sensing tracker 620*a* includes a first sensing module 630*a* and a first actuator that rotates the first sensing module 630*a*, and the second sensing tracker 620*b* includes a second sensing module 630*b* and a second actuator that rotates the second sensing module 630*b*.

The first actuator and the second actuator may be installed inside the body 601, respectively, and the first actuator may rotate the first sensing module 630*a* and the second actuator may rotate the second sensing module 630*b*.

Under the control of the controller, the first actuator can rotate the first sensing module 630*a* so that the first sensing module 630*a* aims at the target position TP1 of the first subject 110, and the second actuator can rotate the second sensing module 630*b* so that the second sensing module 630*b* aims at the target position TP2 of the second subject 120.

As shown in FIG. 8(*a*), the first sensing tracker 620*a* can rotate in the direction of ra1 and/or in the direction of ra2 by the first actuator installed inside the body 601, and the first sensing module 630*a* can aim at a specific point by such rotation.

Also, the second sensing tracker 620*b* can rotate in the rb1 direction and/or in the rb2 direction by the second actuator installed inside the body 601, and the second sensing module 630*b* can aim at a specific point by such rotation.

The first sensing module 630*a* may include a first infrared sensor 631*a*, a first position detector 632*a*, and a first light pointer 633*a*, and the second sensing module 630*b* may include a second infrared sensor 631*b*, a second position detector 632*b* and a second light pointer 633*b*.

When the image-processor specifies the coordinates of the first target position iTP1 on the first object i110 through the analysis of the image IMN, the controller can calculate the coordinates in real space corresponding to the coordinates of the first target position iTP1 on the image and the controller controls the first actuator in accordance with the calculated coordinates to rotate the first sensing tracker 620*a* so that the first sensing module 630*a* can aim at the first target position TP1.

The first infrared sensor 631*a* of the first sensing module 630*a* detects infrared radiation irradiated from the first subject 110 and generates an electric signal corresponding to the intensity of the detected infrared radiation.

The first light pointer 633*a* of the first sensing module 630*a* irradiates light using the first target position TP1 as an aiming point.

After the first light pointer 633*a* irradiates light, the irradiated light reaches the first target position TP1 of the first subject 110 and is reflected back, and the returned light can be received by the first position detector 632*a*.

The first position detector 632*a* already knows the information on the energy of the light irradiated from the first light pointer 633*a* and detects the energy of the reflected light when receiving the reflected light. Distance information from the difference to the first target position TP1 in real space may be calculated.

As described above, the controller may finally calculate the temperature of the first subject 110 by using the sensing result of the first infrared sensor 631*a* and the measurement result of the first position detector 632*a*.

Simultaneously with the process of the first sensing tracker 620*a* as described above, the process of the second sensing tracker 620*b* may also proceed.

That is, when the image-processor specifies the coordinates of the second target position iTP2 on the second subject i120 through the analysis of the image IMN, the controller can calculate the coordinates in real space corresponding to the coordinates of the second target position iTP2 on the image and the controller controls the second actuator in accordance with the calculated coordinates to rotate the second sensing tracker 620*b* so that the second sensing module 630*b* can aim at the second target position TP2.

The second infrared sensor 631*b* of the second sensing module 630*b* detects infrared radiation irradiated from the second subject 110 and generates an electric signal corresponding to the intensity of the detected infrared radiation.

The second light pointer 633*b* of the second sensing module 630*b* irradiates light using the second target position TP2 as an aiming point.

After the second light pointer 633*b* irradiates light, the irradiated light reaches the first target position TP2 of the second subject 120 and is reflected back, and the returned light can be received by the second position detector 632*b*.

The second position detector 632*b* already knows the information on the energy of the light irradiated from the second light pointer 633*b* and detects the energy of the reflected light when receiving the reflected light. Distance information from the difference to the second target position TP2 in real space may be calculated.

As stated above, the temperature measuring device according to the present invention is related to a non-contact type temperature measuring device, and there is an effect of measuring the temperature of a target, recognizing position information on the movable target object, and correcting an error according to a difference between a distance and an angle from the movable target object using this information, thereby enabling accurate temperature measurement.

What is claimed is:

1. A temperature measuring device comprising:
   a camera configured to acquire a color image within a field of view;
   an image-processor configured to simultaneously detect a plurality of target objects corresponding to a plurality of subjects from the image acquired by the camera;

a controller configured to set an order for each of the subjects corresponding to the detected target objects so as to set a first subject and a second subject according to the set order, wherein the image-processor specifies a first target region on the first subject through a first target object and a second target region on the second subject through a second target object according to the set order, wherein the set order is determined in a manner that assigns priority to any one of the first and second subjects that is closer to the camera;

a sensing tracker including a sensing module and an actuator, wherein the sensing module includes:
  a light pointer for irradiating light to a target position on a target region of a subject;
  a position detector for measuring distance information about the target position using light of the light pointer reflected from the target region; and
  an infrared sensor for sensing infrared radiation irradiated from the target region, wherein the actuator is configured to rotate or move the sensing module so that the light pointer, the position detector and the infrared sensor aim at each of the target positions on the subjects according to the set order, wherein the controller, according to the set order, is configured to control the actuator so that the sensing module aims the first target position of the first subject, to obtain the distance information and the infrared radiation sensing information from the first subject, and to calculate the temperature of the first subject by compensating the infrared radiation sensing information with the distance information, wherein the controller is then configured to control the actuator so that the sensing module aims the second target position of the second subject, to obtain the distance information and the infrared radiation sensing information from the second subject, and to calculate the temperature of the second subject by compensating the infrared radiation sensing information with the distance information.

2. The temperature measuring device according to claim 1, wherein the image-processor is configured to process using artificial intelligence for discriminating by learning whether the target object detected from the acquired image is a human, a specific livestock, or a specific stuff, and
the image-processor is configured to find and specify the target region according to the type of the detected target object.

3. The temperature measuring device according to claim 1, wherein the image-processor is configured to detect a person as the target object from the acquired image, recognize a part of the detected person object, and specify the recognized part as the target region,
wherein the sensing tracker is configured to measure position information of a point on the target region specified by the image-processor for each frame acquired by the camera, and sense infrared radiation based on the target region, and
wherein the controller is configured to calculate a body temperature of the person by correcting the temperature according to the infrared sensing information using the measured position information of the target region.

4. The temperature measuring device according to claim 1, wherein the image-processor is configured to detect a livestock as the target object from the acquired image, recognize a part of the body of the detected livestock, and specify the recognized part as the target region,
wherein the sensing tracker is configured to measure position information of a point on the target region specified by the image-processor for each frame acquired by the camera, and sense infrared radiation based on the target region, and
wherein the controller is configured to calculate a body temperature of the livestock by correcting the temperature according to the infrared sensing information using the measured position information of the target region.

5. The temperature measuring device according to claim 1, wherein the image-processor is configured to detect a specific item as the target object from the acquired image, recognize a part of the item, and specify the part as the target region,
wherein the sensing tracker is configured to measure position information of a point on the target region specified by the image-processor for each frame acquired by the camera, and sense infrared radiation based on the target region, and
wherein the controller is configured to calculate the temperature of the item by correcting the temperature according to the infrared sensing information using the measured position information of the target region.

6. The temperature measuring device according to claim 1, wherein the controller presets mapping information on a coordinate system of the camera and a coordinate system in real space through a calibration of the camera, and
the controller controls the actuator so that the sensing module aims at the target position on the target region of the subject corresponding to the target region of the target object on the image specified by the image-processor.

7. The temperature measuring device according to claim 1, wherein the image-processor is configured to specify the first target region on the first subject and the second target region on the second subject from each of a plurality of frames of the color images captured by the camera so that the controller tracks the first target position on the first target region of the first subject and the second target position on the second target region of the second subject during the temperature calculation with respect to the first subject and the second subject according to the set order.

8. A temperature measuring device comprising:
a camera configured to acquire a color image within a field of view;
an image-processor configured to simultaneously detect a plurality of target objects including a first target object and a second target object corresponding to a plurality of subjects including a first subject and a second subject from the image acquired by the camera and specify a target region on each of the plurality of the target objects, wherein the image-processor specifies a first target region on the first subject through the first target object and second target region on the second subject through the second target object;
a first sensing tracker including a first sensing module and a first actuator; and
a second sensing tracker including a second sensing module and a second actuator,
wherein a controller is configured to match the first sensing tracker with the first subject and to match the second sensing tracker with the second subject according to specifying the first subject and the second subject from the acquired image,
wherein the controller is configured to set an order for each of the subjects corresponding to the detected target objects so as to set the first subject and the second subject according to the set order, the set order being determined in a manner that assigns priority to any one of the first and second subjects that is closer to the camera, wherein the first sending module includes:
   a first light pointer for irradiating light to a first target position on the first target region of the first subject;
   a first position detector for measuring distance information about the first target position using light of the first pointer reflected from the first target region; and
   a first infrared sensor of sensing infrared radiation irradiated from the first target region, wherein the first actuator is configured to rotate or move the first sensing module so that the first light pointer, the first position detector and the first infrared sensor aim at the first target position on the first subject, and wherein the second sensing module includes:
   a second light pointer for irradiating light to a second target position on the second target region of the second subject;
   a second position detector for measuring distance information about the second target position using light of the second light pointer reflected from the second target region; and
   a second infrared sensor for sensing infrared radiation irradiated from the second target region, wherein the second actuator is configured to rotate or move the second sensing module so that the second light pointer, the second position detector and the second infrared sensor aim at the second target position on the second subject, wherein the controller is configured to
   control the first actuator and the second actuator so that the first sensing module aims the first target position of the first subject and the second sensing module aims the second target position of the second subject,
   obtain the distance information and the infrared radiation sensing information from the first subject and the second subject, respectively, and
   calculate the temperature of the first subject by compensating the infrared radiation sensing information with the distance information on the first subject, and the temperature of the second subject by compensating the infrared radiation sensing information with the distance information on the second subject.

9. A control method for temperature measuring comprising:
   acquiring a color image within a field of view by a camera;
   simultaneously detecting, by an image-processor, a plurality of target objects including a first target object and a second target object corresponding to a plurality of subjects including a first subject and a second subject from the acquired image and specifying a target region on each of the plurality of the target objects, wherein the image-processor specifies a first target region on the first subject through the first target object and second target region on the second subject through the second target object;
   matching, by a controller, a first sensing tracker with the first subject and matching a second sensing tracker with the second subject according to specifying the first subject and the second subject from the acquired image, wherein the first sensing tracker includes a first sensing module and a first actuator; and the second sensing tracker includes a second sensing module and a second actuator, wherein the controller is configured to set an order for each of the subjects corresponding to the detected target objects so as to set the first subject and the second subject according to the set order, the set order being determined in a manner that assigns priority to any one of the first and second subjects that is closer to the camera, wherein the first sending module includes:
   a first light pointer for irradiating light to a first target position on the first target region of the first subject;
   a first position detector for measuring distance information about the first target position using light of the first pointer reflected from the first target region; and
   a first infrared sensor of sensing infrared radiation irradiated from the first target region, wherein the first actuator is configured to rotate or move the first sensing module so that the first light pointer, the first position detector and the first infrared sensor aim at the first target position on the first subject, and wherein the second sensing module includes:
   a second light pointer for irradiating light to a second target position on the second target region of the second subject;
   a second position detector for measuring distance information about the second target position using light of the second light pointer reflected from the second target region; and
   a second infrared sensor for sensing infrared radiation irradiated from the second target region, wherein the second actuator is configured to rotate or move the second sensing module so that the second light pointer, the second position detector and the second infrared sensor aim at the second target position on the second subject;

controlling, by the controller, the first actuator and the second actuator so that the first sensing module aims the first target position of the first subject and the second sensing module aims the second target position of the second subject;

obtaining, by the controller, the distance information and the infrared radiation sensing information from the first subject and the second subject, respectively, and calculating, by the controller, the temperature of the first subject by compensating the infrared radiation sensing information with the distance information on the first subject, and the temperature of the second subject by compensating the infrared radiation sensing information with the distance information on the second subject.

* * * * *